United States Patent [19]

Vass et al.

[11] 3,854,379

[45] Dec. 17, 1974

[54] TOROIDAL SURFACE PROCESSING MACHINE

[75] Inventors: Francis Vass; Dezideriu Horacek, both of Brasov, Romania

[73] Assignee: Uzina de Autocamioane Brasov, Brasov, Romania

[22] Filed: Aug. 21, 1972

[21] Appl. No.: 282,551

[52] U.S. Cl. ............................................. 90/15.1 A
[51] Int. Cl. ......................... B23c 3/16, B23c 3/34
[58] Field of Search .......... 90/15.1 A, 15.1 B, 15 R, 90/11 C, 15.1

[56] References Cited
UNITED STATES PATENTS

| | | | |
|---|---|---|---|
| 1,985,753 | 12/1934 | Weiss | 90/15.15 |
| 2,057,721 | 10/1936 | Koppel | 90/15.15 |
| 2,297,551 | 9/1942 | Greve | 90/15.15 |
| 2,352,753 | 7/1944 | Anderson | 90/15.2 X |

FOREIGN PATENTS OR APPLICATIONS

| | | | |
|---|---|---|---|
| 1,131,565 | 2/1957 | France | 90/15.15 |

Primary Examiner—Andrew R. Juhasz
Assistant Examiner—Z. R. Bilinsky
Attorney, Agent, or Firm—Karl F. Ross; Herbert Dubno

[57] ABSTRACT

The toroidal surfaces of a constant-velocity ball-coupling half are machined by a pair of milling cutters which are advanced into a workpiece and orbited about respective axes which intersect at 90°. The cutters are withdrawn and the collet holding the workpiece is rotated through 180° about a third axis intersecting the other two axes at 90° and then clamped tightly by a pair of wedging pistons. Each cutter is mounted eccentrically on a cylindrical spindle formed with a toothed sector engaged by a double-acting rack piston which rotates the spindle. Another hydraulic cylinder arrangement is provided parallel to each cylinder with its piston coupled to the respective spindle by a fork so that reciprocation of this piston reciprocates the spindle and cutter.

9 Claims, 6 Drawing Figures

PATENTED DEC 17 1974

TOROIDAL SURFACE PROCESSING MACHINE

FIELD OF THE INVENTION

The present invention relates to an apparatus for milling toroidal ball surfaces of seats in a coupling half for use in a constant-velocity (homokinetic) coupling.

BACKGROUND OF THE INVENTION

Each coupling half of a constant-velocity coupling, for example of the Bendix-Weiss type, is formed with four toroidal surfaces in which torque-transmitting balls ride. These surfaces must be perfectly symmetrical and must match one another perfectly for proper functioning of the coupling. To this end the machining process is extremely exacting, requiring the full-time attention of an expert machinist in order to obtain a usable product. This obviously makes the cost of such parts extremely high.

OBJECTS OF THE INVENTION

It is therefore an object of the present invention to provide an apparatus for machining a ball-coupling half.

Another object is the provision of an apparatus for milling the toroidal seats for the balls in a constant-velocity coupling, for example of the Bendix-Weiss type.

SUMMARY OF THE INVENTION

These objects are obtained by an apparatus having a pair of tools which can be orbited about respective axes and which can be displaced parallel to these axes. The workpiece is held at the intersection of these two axes and can itself be rotated through 180° about an axis intersecting the two tool axes. This apparatus functions, according to the present invention, by first advancing the two tools into the workpiece, orbiting them through the requisite arc to form the first and second seats then withdrawing them from the workpiece, to return them to their starting position rotating the workpiece through 180°, and finally advancing and orbiting the tools again to form the third and fourth seats.

The tools, according to another feature of this invention, are milling cutters which are rotated. Each cutter is carried by an eccentric shaft journaled in a sleeve or spindle carried on the apparatus. Each such sleeve can be displaced axially and rotated about its own axis.

According to another feature of this invention, the workpiece is chucked in a hydraulically operated draw collet which itself may be rotated through 180° and clamped in either of two positions offset by 180°.

According to another feature of the present invention indexing or positioning means is provided for orienting the workpiece.

DESCRIPTION OF THE DRAWING

The above and other objects, features, and advantages will become more readily apparent from the following, reference being made to the accompanying drawing in which.

SPECIFIC DESCRIPTION

Figure 2:
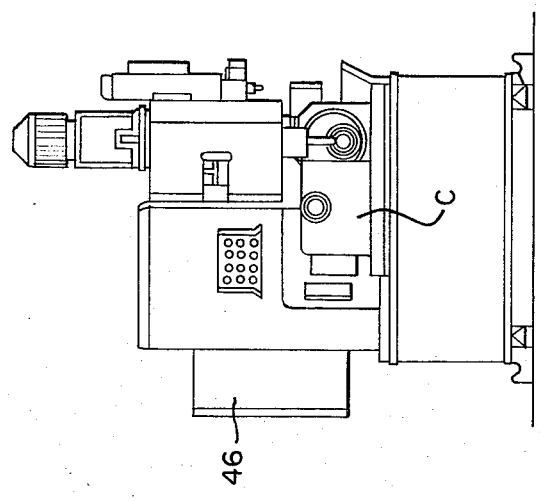
FIG. 2 is a side view of the apparatus of FIG. 1.
Figure 1:
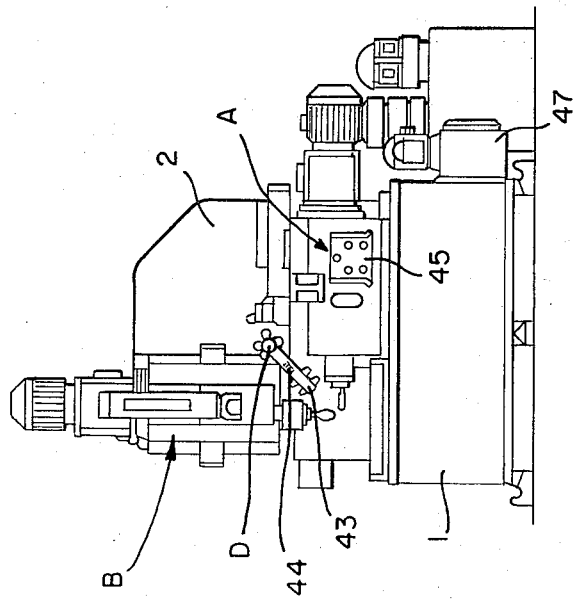
FIG. 1 is an end elevational view of the apparatus according to the present invention.

As seen in FIGS. 1 and 2 the apparatus has a frame or support 1 on which is mounted a vertical column 2. A horizontal cutter head A is carried on the support 1, a vertical cutter B is mounted on the column 2, and a workpiece clamp C is also mounted on the frame 1. Arranged at 45° to the clamp C is a workpiece-orienting device D.

Figure 3:
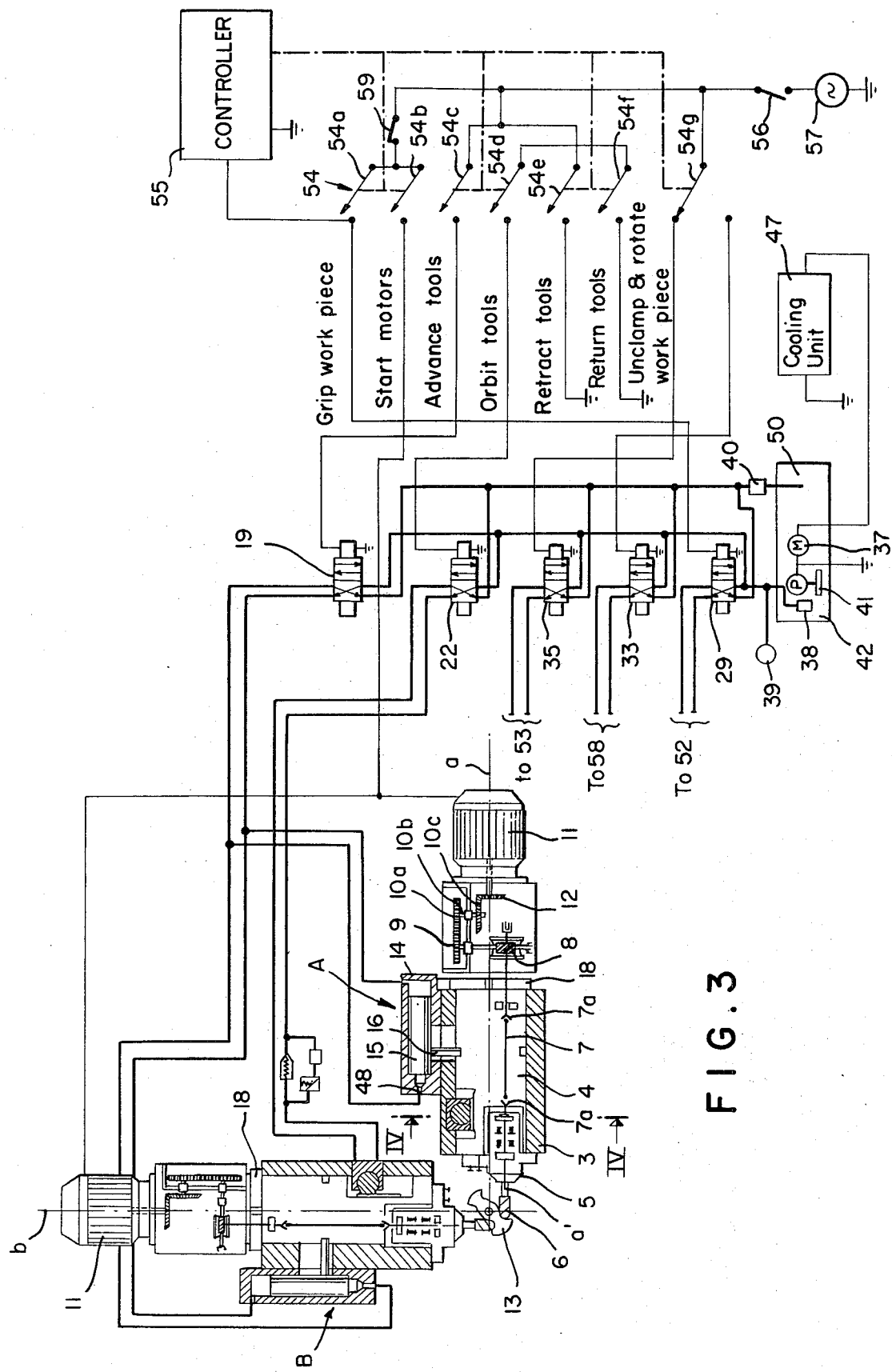
FIG. 3 is a section through the tool heads of the FIG. 1 apparatus, with the controls shown schematically.

The heads A and B are identical although arranged at an angle of 90° to one another. As shown in FIG. 3 head A comprises a cast housing 4 which is fixed on the support 1. A hollow cylindrical spindle 4 is received in the housing 3 and is rotatable about an axis $a$ which intersects and is at a right angle to the corresponding axis $b$ of the head B. Mounted rotatably and eccentrically in the sleeve 4 is a chuck 5 in which a milling cutter 6 of hemispherical profile is received. An extensible drive shaft 7 provided with universal joints 7a at its ends is connected to the chuck to rotate the cutter 6 about an axis $a'$ parallel to but offset from the axis $a$. This shaft 7 is coupled through a worm gear 8 to a large diameter gear 9 lying in a plane parallel to the axis $a$ and meshing with a pinion 10a carried on a shaft 10b on whose other end is another gear wheel 10c engaged by a bevel gear 12 in turn rotatable about the axis $a$ and driven by an electric motor 11. Thus rotation of the gear 12 by the motor 11 will rotate the cutter 6.

The hollow spindle 4 itself is axially displaceable in is housing 3 by a fixed cylinder 14 in which a double-acting piston 15 is reciprocal. A fork 16 carried on the piston 15 is connected to the spindle 4. A variable orifice 48 is provided at the end of the cylinder 14 toward the broach 6 to control the rate of advance of the piston 15 when the opposite chamber is pressurized. The pressurization for both cylinders 14 is effected by a solenoid valve 19 connected to a source 50 of fluid pressure. A nut 18 screwed into the right-hand end of the sleeve 4 engages the end of the housing 3 to limit the axial travel of the cutter 6.

Figure 4:
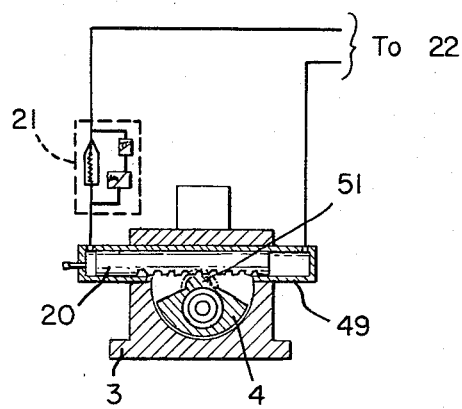
FIG. 4 is a section taken along line IV — IV of FIG. 3.

A cylinder 49 (FIG. 4) serves to rotate the sleeve 4 by means of a double-acting rack piston 20 meshing with a toothed sector 51 formed on this sleeve 4 which is cut away at this point as shown in FIG. 4. A hydraulic restriction 21 controls the speed with which the cutter 6 is made to orbit around the axis $a$ by the piston 20. A solenoid valve 22 serves to connect the two cylinders 49 to the source 50.

The heads A and B, as stated above, are identical in all respects except that the motor 11 for the head B is made to operate in a sense opposite to that of the motor of the head A for proper generation of the toroidal surfaces in the workpiece or ball-coupling half blank 13 between them.

Figure 5:
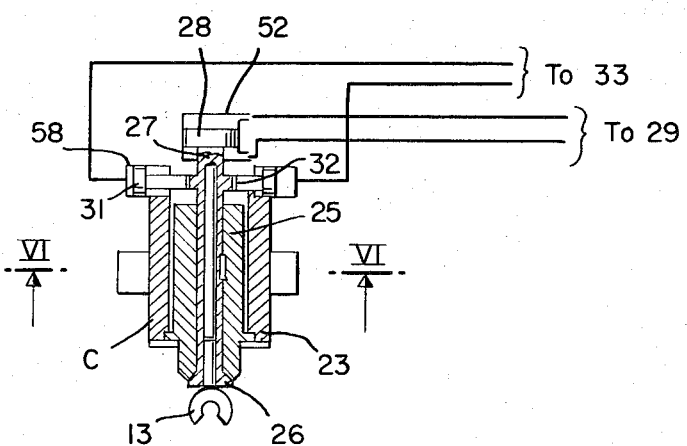
FIG. 5 is an axial section through the workpiece clamping unit.
Figure 6:
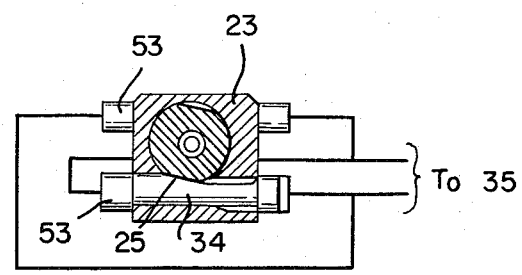
FIG. 6 is a section taken along line VI — VI of FIG. 5.

The clamping and rotating arrangement C for this workpiece 13 is shown in FIGS. 5 and 6. This unit comprises an external casing 23 fixed to the frame 1 of the apparatus. A hard nitrided bushing 24 in which a cylindrical hollow spindle 25 is rotatable is received in the case 23. An extensible bushing or draw collet 26 is screwed into a drive tube 27 keyed into the spindle 25.

This tube 52 is axially displaceable in the sleeve 27 under the force of a piston 28 in a cylinder 52. The workpiece 13 is clamped by the collet 26 when the chamber of the double-acting piston 28 toward the unit C is pressurized by fluid from the source 50 flowing through a solenoid valve 33.

The drive tube 27 is formed, like the spindles 4, with a toothed sector 32 which is engaged by a double-acting rack piston 31 in a cylinder 58 which can be pressurized by fluid controlled by a valve 29.

In order to clamp the spindle 25 very tightly in the casing 23, this spindle is formed with a pair of diametrically opposed parallel flats 23 which can be engaged by diametrically effective wedges 34 each controlled by a double-acting hydraulic cylinder 53 in turn connectable through a solenoid valve 35 to the source 50.

The pressure source 50 comprises a reservoir 42 from which hydraulic fluid is drawn through a strainer 41 by a pump 36 operated by an electric motor 37. A pressure-regulating valve 38 and a gauge 39 are connected downstream of the pump 36 between it and the input lines to the solenoid valve 19, 22, 29, 33 and 35. From the output lines of these solenoid valves the fluid flows through a filter 40 back into the reservoir 42.

As shown in FIG. 1 the workpiece 13 is oriented in the processing position by an apparatus D comprising an arm 43 provided with a swinging bolt (not shown) and two grapples 44 which palpate the workpiece as it revolves to ensure that it is properly oriented during processing. In addition the machine is operated by a control board 45 connected to an electrical-equipment case 46 housing a controller 55 and a bank 54 of switches 54 *a* – *g*. The tools and workpiece are cooled by a cooling unit 47.

The device operates as follows:

A workpiece 13 is placed in the open collet 26 and a starting switch 56 connected to a power source 57 is connected to one side of the cooling unit 47 and the pump 37, the other sides of these two devices as well as the other side of the electric source 57 being grounded. Then the first two switches normally open 54*a* and 54*b* of the bank 54 are manually actuated by the machine operator to grip the workpiece in the chuck 26 and start the motors 11 thereby rotating the broaches 6 about their axes *a* and *b*. This also sets the controller 55 which is connected to the remaining switches 54*c–g* in operation. First the switch normally open 54*c* is closed by the controller to actuate the valve 19 and advance the tools 6 into the workpiece 13. Then the normally open switch 54*d* is closed to orbit the tools 6 by means of pressurization of the cylinders 31. The orbiting speed is determined by the adjustable restrictions 21 and the size of the orbiting arc is determined by how long these tools are allowed to orbit by the controller 55. The controller then actuates the two normally closed switches 54*e* – 54*f* in order to break the circuit between the solenoids 19 and 22 to allow their automatic return that effects the retraction and orbital return of the tools. Thw switch 54*g* is an SPDT switch which is next operated to depressurize the chambers 53 and unclamp the spindle and then pressurize the cylinder 58 to rotate the workpiece through 180°. Thereafter the switch 54*g* is returned to the position illustrated in FIG. 3 and the switch 54*c*, the switch 54*d*, and the ganged switches 54*e* and 54*f* are operated, in that order, to machine the second two seats in the workpiece. A switch 59 can be connected to the positioning device D to prevent clamping of the workpiece unless it is in just the right position between the two cutters 6.

We claim:

1. An apparatus for milling ball seats into a constant-velocity ball-coupling half comprising:
 a support;
 means on said support to displace a first tool parallel to a first axis;
 means on said support for orbiting said first tool about said first axis;
 means on said support for displacing a second tool parallel to a second axis intersecting said first axis;
 means on said support for orbiting said second tool about said second axis; and
 clamping means on said support for holding a coupling-half blank at the intersection of said first and second axes and for rotating said blank through 180° about a third axis transverse to and intersecting said first and second axes, each of said means for orbiting including a spindle rotatable about the respective axis, said tool being mounted eccentrically on said spindle, a toothed sector provided on said spindle, a rack piston meshing with said sector, and cylinder means for displacing said piston to rotate said spindle.

2. The apparatus defined in claim 1 wherein said first and second axes intersect at 90°.

3. The apparatus defined in claim 2 wherein said third axis intersects said first and second axes at 90°.

4. An apparatus for milling ball seats into a constant-velocity ball-coupling half comprising:
 a support;
 means on said support to displace a first tool parallel to a first axis;
 means on said support for orbiting said first tool about said first axis;
 means on said support for displacing a second tool parallel to a second axis intersecting said first axis;
 means on said support for orbiting said second tool about said second axis; and
 clamping means on said support for holding a coupling-half blank at the intersection of said first and second axes and for rotating said blank through 180° about a third axis transverse to and intersecting said first and second axes, each of said means for orbiting including a spindle rotatable about the respective axis, said tool being mounted eccentrically on said spindle, each of said means for displacing a tool parallel to an axis including a piston displaceable parallel to the respective axis, a fork between said piston and the respective spindle and cylinder means for displacing said piston and thereby axially displacing the respective spindle.

5. The apparatus defined in claim 4 wherein said first and second axes intersect at 90°.

6. The apparatus defined in claim 5 wherein said third axis intersects said first and second axes at 90°.

7. An apparatus for milling ball seats into a constant-velocity ball-coupling half comprising:
 a support;
 means on said support to displace a first tool parallel to a first axis;
 means on said support for orbiting said first tool about said first axis;

means on said support for displacing a second tool parallel to a second axis intersecting said first axis;

means on said support for orbiting said second tool about said second axis; and clamping means on said support for holding a coupling-half blank at the intersection of said first and second axes and for rotating said blank through 180° about a third axis transverse to and intersecting said first and second axes, said clamping means including a spindle carrying the workpiece and formed with a pair of diametrically opposed flats, at least one piston wedgingly engageable with said flats, and cylinder means for displacing said piston into and out of wedging engagement with said flats.

8. The apparatus defined in claim 7 wherein said first and second axes intersect at 90°.

9. The apparatus defined in claim 8 wherein said third axis intersects said first and second axes at 90°.

* * * * *